United States Patent [19]

Smith

[11] Patent Number: 4,502,878
[45] Date of Patent: Mar. 5, 1985

[54] TUBULATING DEVICE AND METHOD OF TUBULATION

[76] Inventor: Edwin D. Smith, Dutch Mill Rd., Malaga, N.J. 08328

[21] Appl. No.: 597,033

[22] Filed: Apr. 5, 1984

[51] Int. Cl.³ .................................. C03B 23/207
[52] U.S. Cl. ...................................... 65/36; 65/42; 65/105; 65/272; 65/285
[58] Field of Search ............... 65/272, 285, 36, 42, 65/105

[56] References Cited

U.S. PATENT DOCUMENTS

| 430,041 | 6/1890 | Rylands et al. | 65/42 |
| 2,146,572 | 2/1939 | Hahn et al. | 65/105 |

FOREIGN PATENT DOCUMENTS

| 816506 | 8/1937 | France | 65/36 |
| 505314 | 5/1939 | United Kingdom | 65/42 |

Primary Examiner—Arthur Kellogg
Attorney, Agent, or Firm—Thomas A. Lennox

[57] ABSTRACT

An apparatus and method for tubulating a glass barrel including a glass lathe with the tubing in one chuck and a barrel holding device in the other chuck having a pair of spring members to engage the openings of the barrel and hermetically seal the barrel with an air pressure source to induce pressure to the inside of the barrel with the method including heating the end of the tubing and the point on the barrel for attachment, blowing a hole out through the point and welding the tube over the hole while the parts are spinning on the lathe.

13 Claims, 7 Drawing Figures

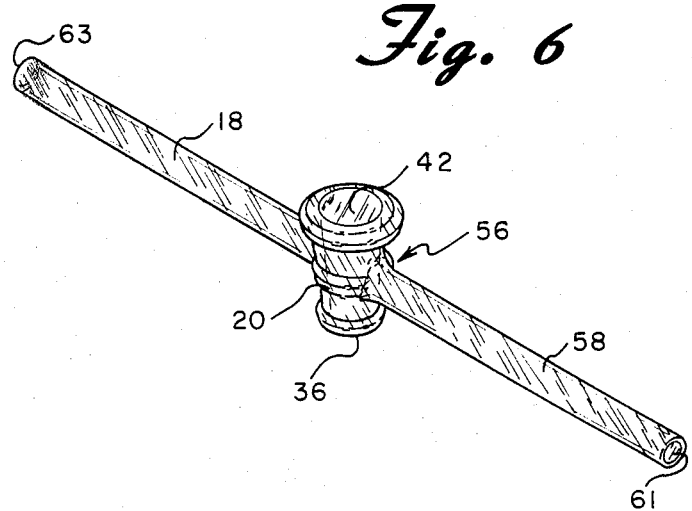
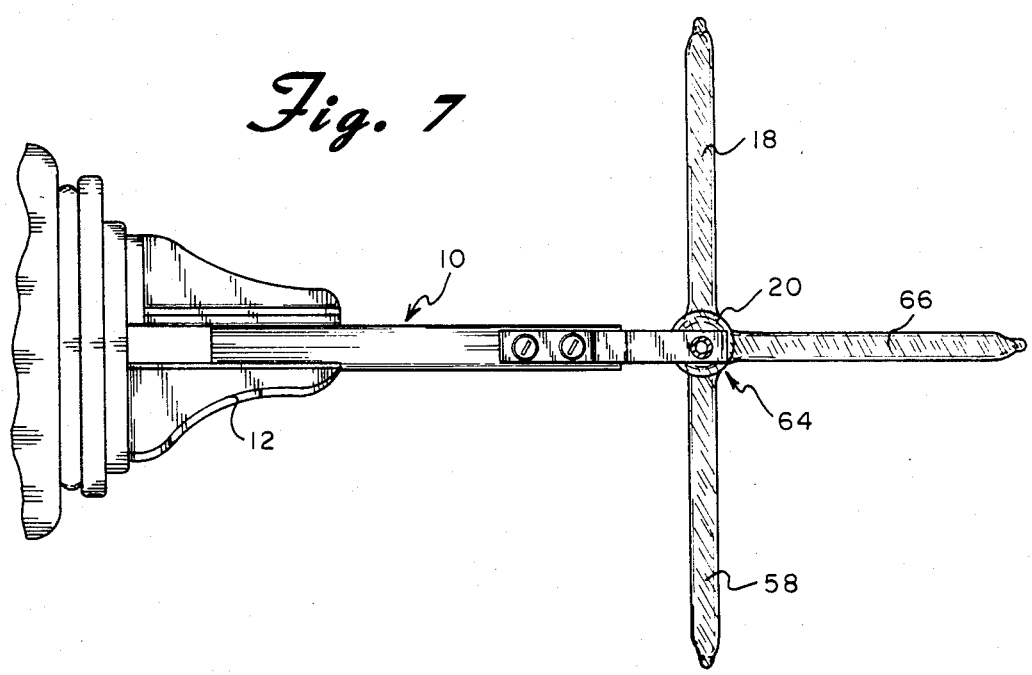

TUBULATING DEVICE AND METHOD OF TUBULATION

BACKGROUND OF THE INVENTION

This invention relates to tubulating a barrel, that is sealing a glass tube to a barrel and opening a hole through the barrel communicating to the inside of the tube. In particular, this invention relates to the construction of stopcocks including not only the standard two way stopcocks but also, T-Bore, 3-way and 4-way stopcocks.

The standard stopcock includes a glass barrel with a tapered machined surface on the inside through which a matching tapered cone-shaped plug interfits connected to a handle to turn the plug member. At least one hole is drilled through the plug member. Glass tubing is welded, to the sides of the barrel with holes through the barrel to align with the ends of the holes in the plug member. In the trade this tubulating process is known as "sealing the tubing". Stopcocks and like parts are constructed in a variety of ways and of tubulating the barrel is a continuing problem. The holes have been drilled out, pulled out or burned out with a gas torch. Drilling sets up strains in the Pyrex or quartz glass of the barrel and produces particles which interfere with processing and must be scrupulously removed. Burning out or pulling out holes in a glass requires substantial heat sometimes deforming the barrel and yielding a high reject rate.

There is a real need for an apparatus and method for producing stopcocks at a high rate of speed under conditions that will provide few rejects due to distortion or stray particulates and provide with a strong tube to barrel bond.

A method for the production of glass stopcocks is described in U.S. Pat. No. 2,648,179 to Milton Manes, et al. Other methods and apparatuses for perforating and tubulating glass bodies is described in U.S. Pat. No. 2,146,572 to Clarence E. Hahn, et al., U.S. Pat. No. 2,272,927 to Luke L. Stager, U.S. Pat. No. 2,340,459 to William W. Eitel, U.S. Pat. No. 3,114,619 to Joseph E. Nitsche, et al. and U.S. Pat. No. 3,212,870 to Harry F. Condon. None of the present devices and methods satisfy the above needs nor attain the objects listed herein below.

SUMMARY OF THE INVENTION

It is a object of this invention to provide an apparatus that will allow multiple tubulation of a glass body such as a tubular barrel of a stopcock.

It is a further object of this invention to provide an apparatus and method to provide speed of operation with essentially no risk of distorting the barrel during tubulation.

It is an additional object of this invention to provide a method and apparatus that will allow accurate point heating of the barrel without substantially heating the surrounding area of the barrel.

It is a further object of this invention to provide an apparatus and method for tubulating stopcock barrels without producing glass chips or particles inside the barrel.

It is a further object of this invention to provide an apparatus and method for tubulating a barrel which does not remove material from the barrel.

It is an additional object of this invention to provide an apparatus and method which will allow tubulating a barrel on opposite sides of the barrel using the same apparatus.

It is an additional object of this invention to provide a method and apparatus which during the process of opening a hole in the side of the barrel heats that area of the barrel for immediate subsequent tubulating.

It is an additional object of this invention to provide a tubulating process and apparatus which makes reproducible results with little variance from part to part.

It is a further object of this invention to eliminate the necessity of annealing barrels prior to the tubulating process.

It is an additional object of this invention to provide an apparatus and method wherein, after one tubulation has been completed, the barrel is automatically alligned so that a second tubulation may be positioned exactly opposite the first.

It is a further object to provide an apparatus and method to produce stopcocks wherein the tubulating process can not produce minute cracks, scratches, or stress points in the barrel during the tubulating process.

This invention firstly involves blowing out holes in the side of glass tubes and in particular glass barrels and tubulating the hole.

In particular, this invention includes an apparatus and method to connect glass tubing to and opening into the sides of a glass barrel having at least one opening and preferably being a cylindrical barrel having openings at each end, and more preferably to a stopcock barrel.

The apparatus of this invention includes a tube, preferably of metal, of sufficient size to receive any glass tubing that is already sealed to the glass barrel to be tubulated. A holding device is fixed on one end of the tube to hold the glass barrel in a position to expose the area of the barrel to which a tubing of glass is to be sealed. A pressing device on the holding device is constructed to hermetically seal all of the openings in the barrel and a pressure source device is provided in pressure communication with the interior of the barrel through the sealing device, to provide pressure sufficient to blow out a hole in the barrel after the point of attachment has been sufficiently heated.

A preferred method of the invention to connect glass tubing to and open into the side of a glass barrel having two open ends includes holding a tube of glass in a glass lathe chuck and holding a barrel holding device in a second opposing chuck positioned to align the exposed end of the tubing with the point on the barrel at which it is to be sealed. The method further includes hermetically sealing off both ends of the barrel by holding a sealing surface to close the ends and synchronously spinning both chucks in the same direction. The method further includes heating the end of the tubing and the point on the barrel, inducing pressure inside the barrel sufficient to blow a hole out at the point, and contacting the heated end of the tubing with the barrel at the point of the hole. Pressure is maintained in the barrel after joining the tubing to the hole in the barrel to prevent the hole from closing before cooling. It is preferred that method include the capability of sealing a tubing to a barrel opposite a position where a tubing has already been sealed. The method includes using the barrel holding device which includes a tube on which the balance of the barrel holding device is attached. The tube is held in the second opposing chuck and inserting the previously attached tubing into the tube while the barrel is held by the barrel holding device. It is particularly preferred that the methods be used to tabulate stopcocks.

As will be apparent, the apparatus and the method may be utilized to tubulate with or without the spinning lathe although for speed of operation and accuracy, the glass lathe is preferably used.

BRIEF DESCRIPTION OF THE DRAWINGS

FIG. 6 illustrates the completed stopcock tubulation after it has been removed from the device.

FIG. 7 is an elevational view looking downwardly on the device of FIG. 2 showing a four-way stopcock produced in the device.

DESCRIPTION OF PREFERRED EMBODIMENTS

Figure 1:
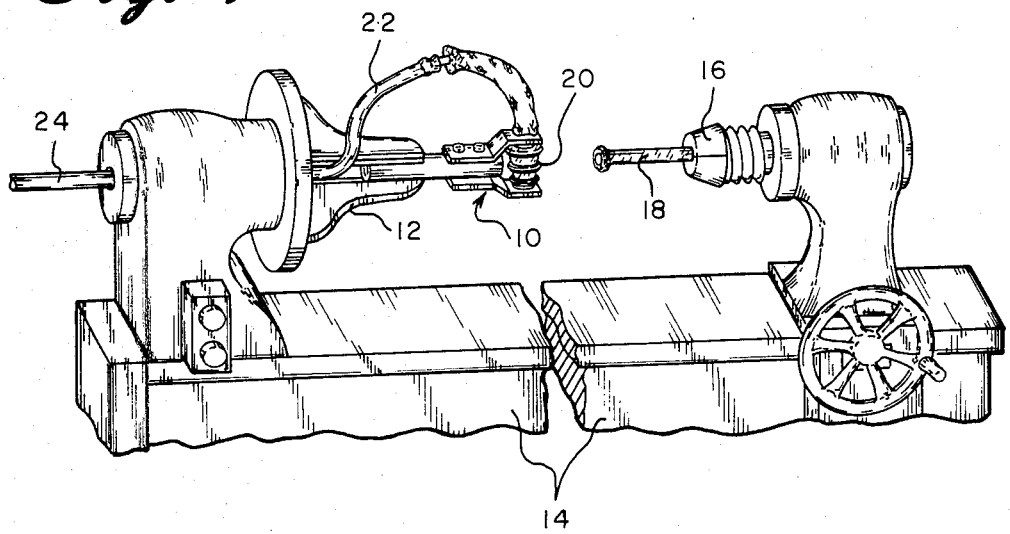
FIG. 1 is a perspective view of a glass lathe holding an apparatus of the present invention holding a glass barrel ready to be tubulated.

A preferred apparatus is illustrated in FIG. 1 to connect glass tubing to and open into the sides of a glass barrel having two open ends includes a glass lathe device to synchronizingly turn two opposing chucks in the same direction on the same center line of spin, wherein the first chuck is capable of holding and turning a piece of glass tubing to be sealed to the barrel. A barrel holding device is held in the second opposing chuck to hold the glass barrel and spin it opposing the exposed end of the glass tubing. The barrel holding device includes a tube of sufficient size, diameter and length to receive glass tubing that has already been attached to the barrel. This tubing is necessary when tubulation is to be carried out on opposite sides of the barrel as in the standard two-way stopcock. A pair of members preferably spring metal members, are mounted on the exposed end of the tube extending outwardly and aligned to hold the open ends of the barrel and to position the barrel opposing the chuck such that the point of attachment is in alignment with the tubing to be attached. Sealing devices are located on both members to hermetically seal off the open ends of the barrel. These hermetically sealing devices are preferably tapered metal disks to interfere with and seal the openings in the barrel. The sealing devices are preferably proximate to the ends of the spring members. The members and sealing devices must not interfere with the opening in the tube so as to allow glass tubing to be freely inserted into the tube. A passage way is provided through one of the sealing devices to communicate with a pressure tube connected to a pressure source device to provide high pressure to the passage and to the inside of the barrel. The pressure source device provides high pressure to blow the hole in the barrel and continuing pressure to maintain the hole during cooling. Fixed fire means is positioned to simultaneously heat the point on the barrel and the end of the glass tubing.

Throughout the specification, the term "barrel" has been used to describe the glass piece to which tubulation is effective. The term "barrel" is intended to include any hollow glass article with at least one opening where tubulation is to be made to the article at another location. Of prime importance is the use of the apparatus and the method on stopcock barrels which have openings at both ends.

In FIG. 1, tubulating device 10 is held in chuck 12 of lathe 14. Chuck 16 holds glass tubing 18 which is to be sealed and tubulated to barrel 20. Chucks 12 and 16 are rotated synchronously by lathe 14 in the same direction. Flexible pressure hose 22 connected to tubulating device 10 extends into chuck 12 through the center of the spinning chuck and out of lathe 14 to hose 24 connected to an air compressor capable of inducing high pressures to the interior of barrel 20. Glass lathes are well known glass working equipment and are supplied by numerous companies including Wale Apparatus Company of 400 Front St., Hellertown, Pa. and a number of glass lathes and fixed fire devices are described in their Catalog No. 82 of September, 1980, incorporated herein by reference. Described therein are a number of glass lathes produced by Heathway Engineering Company a "sister" company of Wale Apparatus Company. The glass lathe is constructed to accurately spin two opposing chucks on the same center of spin synchronously in the same direction. Using a lathe, two tubes, each held in opposing chucks, may be sealed together using heat at the adjacent surfaces. The spinning lathe eliminates the effect of gravity and yields an accurate straight attachment.

Figure 2:
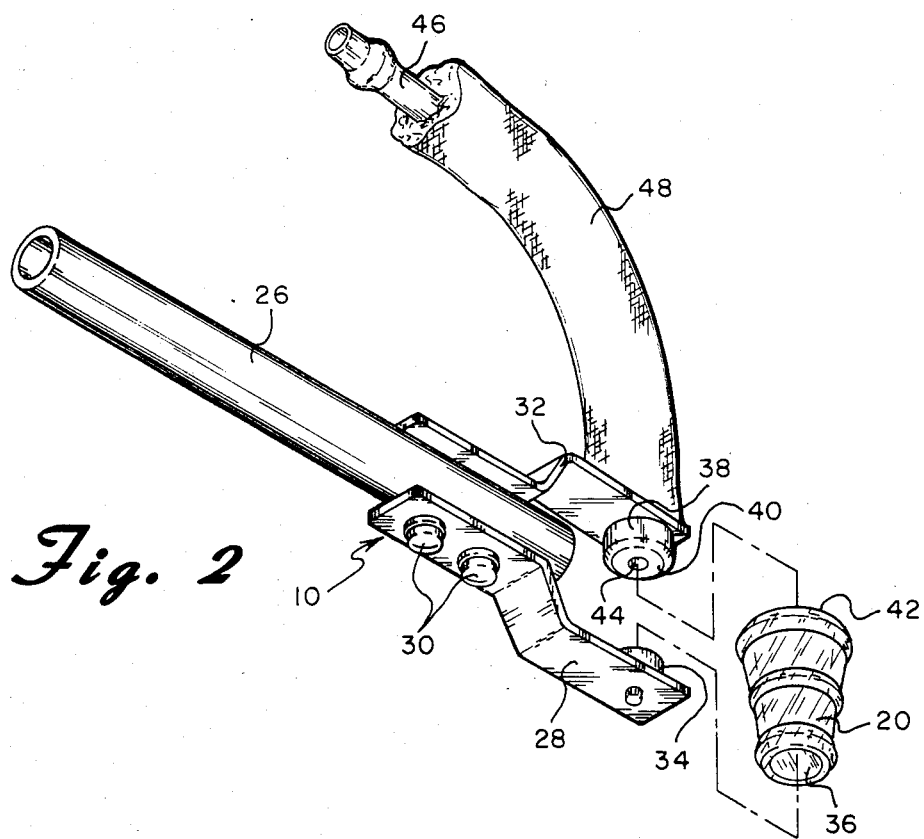
FIG. 2 is a perspective view of an apparatus of the present invention with a glass barrel ready to be inserted into the holder.

In FIG. 2, an expanded perspective view of tubulating device 10 is provided showing tube 26 constructed of ⅜ inch steel pipe having an approximate inside diameter of eight millimeters, which is sufficient to receive small gauge glass tubing. Tube 26 is approximately 150 millimeters long to receive short lengths of glass tubing which have been previously sealed to the barrel next to be tubulated. Spring steel holding member 28 is fixed to tube 26 by metal screws 30 and spring holding member 32 is attached on the opposite side of tube 26 is a similar manner. Brass sealing disk 34 is securely fastened to spring member 28 and is of a size and beveled to fill and seal opening 36 of barrel 20. Since the openings of barrel 20 are machined a good hermetical seal is obtained between the beveled surface of 34 and hole 36. Sealing disk 38 is aligned on the opposing side of spring member 32 and is of a larger size with beveled surface 40 to seal opening 42. Barrel 20 is inserted between sealing disks 34 and 38 by pulling apart spring members 28 and 32 allowing the beveled edges of the sealing disks to seal openings 36 and 34. Passage 44 extends through sealing disk 38 to connect with copper tube 46 protected by heat insulating cover 48. Tube 46 is in turn connected to pressure hose 22 which connects with a high pressure source. If device 10 is to be used by hand, without a lathe, tube 26 is longer and pressure tubing 22 attached to copper tube 46 is inserted into a hole in tube 26 to feed out through the end to the pressure source. The pressure source may be the mouth and lungs of the operator, but is preferably an air compressor connected with controls to provide pressure upon demand of the operator. The amount of pressure to blow out the hole is unlimited, but the pressure to maintain it during welding is limited in degree to not blowing out the joint.

Figure 3:
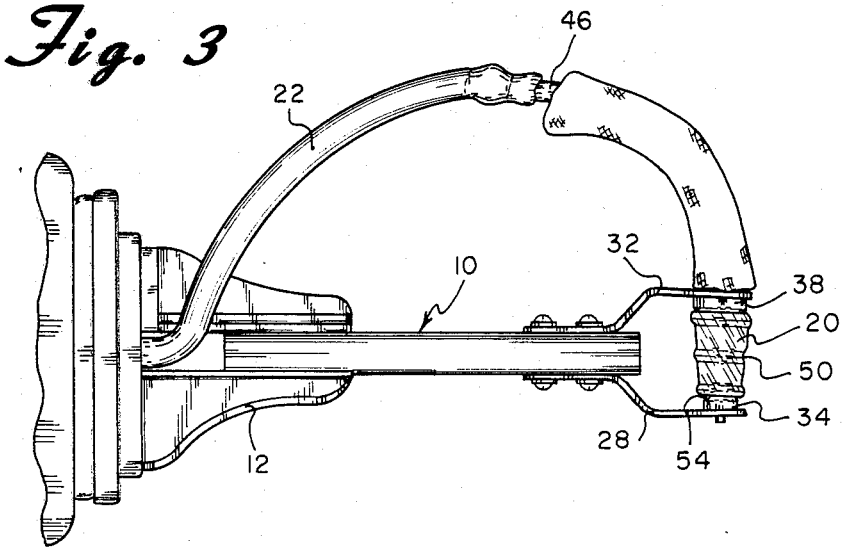
FIG. 3 is an elevational view illustrating the barrel in position after a hole has been blown in the side of the barrel ready for tubulation.
Figure 4:
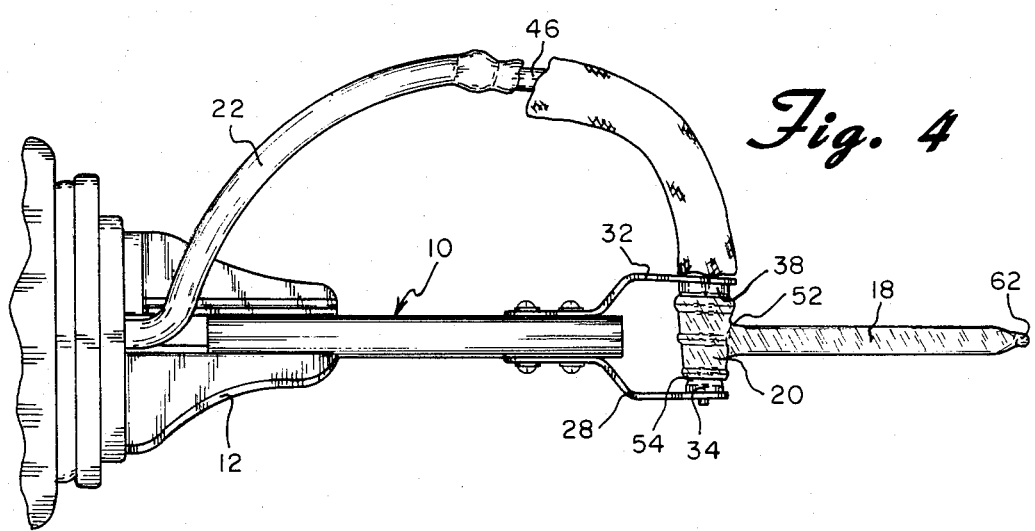
FIG. 4 is an elevational view showing the single tubulation complete.

In FIG. 3, barrel 20 is held tubulating device 10 and rotated in chuck 12. Concentrated heat is applied with an oxy-acetylene torch at point 50. While barrel 20 is held in position by spring members 28 and 32 and sealed by disks 34 and 38 pressure is applied through tube 46 to the interior of barrel 20 to blow out hole 50. Immediately thereafter, as illustrated in FIG. 4, glass tube 18 is brought into contact with the side of barrel 20 and since end 52 of tube 18 has been heated to a plastic stage at the same time hole 50 is formed, immediate sealing takes place. The heating of at point 50 not only produces the hole, but also heats that area of the barrel to a plastic state so that there is an effective, immediate sealing. It should be noted that all forces on barrel 20 are from the inside out so that there is no effective closing of the tapered surface. As is illustrated in FIGS. 3 and 4, tapered surface 54 of sealing disk 34 effectively closes opening 36 of barrel 20. Tube 18, in this illustration, has end 62 closed off, since it is planned to further tubulate barrel 20. It is preferred to have all tubes closed off during sealing to maintain pressure and keep hole 50 open until sufficient cooling takes place. The tubes may be closed with small corks but mass production techniques suggest melting the ends to close them off and latter cutting off the ends to produce the final product.

Figure 5:
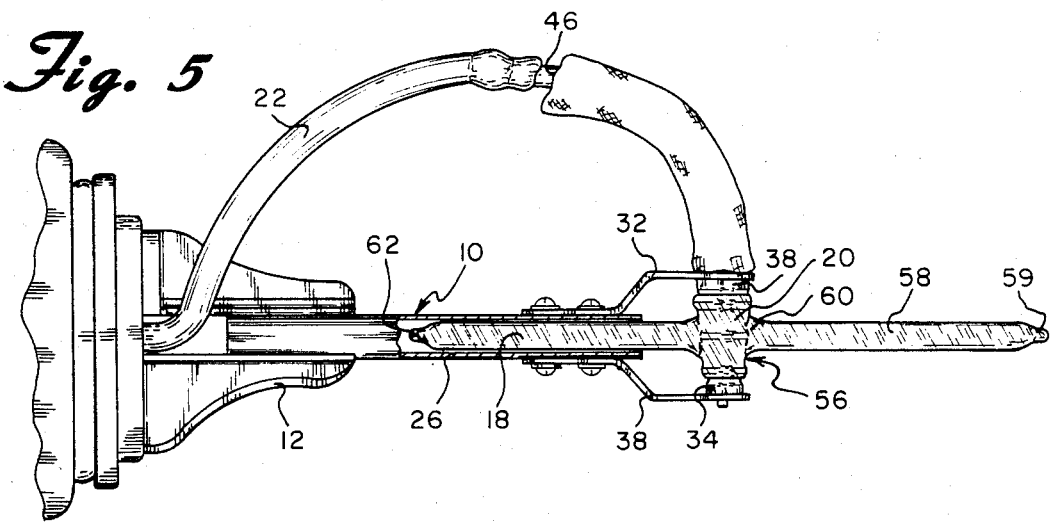
FIG. 5 is an elevational view showing the completed barrel in position after the first tube has been turned around and inserted into the apparatus and a second tubulation has been completed.

In FIG. 5 a two passage way stopcock 56 has been constructed and is held in tubulating device 10. After completion of the tubulation illustrated in FIG. 4, barrel 20 was removed from between sealing disks 34 and 38 and reinserted while sliding tubing 18 inside of tube 26. When barrel 20 is reseated between sealing disks 34 and 38 being held in position by spring members 28 and 32, heat is applied to a point opposite that of point 50 and the process is repeated as above to attach glass tubing 58 at end 62 and opening into barrel 20. Tubing 58 is sealed at end 62 to maintain the pressure inside of barrel 20 during the process of blowing out the hole to connect with tubing 58. In FIG. 6, two passage way stopcock 56 is shown as completed wherein glass tubing 18 and 58 have been connected along a single center line and communicate directly into the interior of barrel 20. The melted closures 62 and 59 have been cut off to provide open ends 63 and 67 respectively. The plug attached to a handle is inserted into opening 42 and tapers to match the interior of barrel 20 extending out through opening 36 to be locked in place. A single hole through the plug will align with the holes through tubes 18 and 58.

As illustrated in FIG. 7 a top view of tubulating device 10 is shown holding four way stopcock 64. Stopcock 64 is constructed by taking the two passage way stopcock 56 and reinserting it in device 10 such that tubing 18 and 58 extend side ways and laterally, normal to the axis of spin. Next, a new glass tubing is connected at a 90 degree angle to tubings 18 and 58, after which barrel 20 is removed from device 20 and that third tubing is inserted into copper tube 26 with barrel 20 reseated between the sealing disks. Finally sealed off glass tubing 66 is tubulated into barrel 20 directly opposite to the last placed tubing to form the four way stopcock. In this end product, the plug has two holes drilled through it to provide the passage ways to the tubings.

While this invention has been described with reference to the specific embodiments disclosed herein, it is not confined to the details set forth and the patent is intended to include modifications and changes which may come within and extend from the following claims.

I claim:

1. An apparatus for glass tubulating to a glass barrel having at least one opening comprising:
   (a) a tube of sufficient size to receive tubing already welded to the glass barrel,
   (b) a holding means attached to the tube to hold the barrel in a position to expose the area of the barrel to which a tubing of glass is to be sealed,
   (c) a pressing means on the holding means to hermetically seal all the openings in the barrel, and
   (d) a pressure source means in pressure communication with the interior of the barrel to provide pressure sufficient to blow out a hole in the barrel.

2. The apparatus of claim 1 wherein there are two openings in the barrel.

3. The apparatus of claim 2 wherein the barrel is a stopcock barrel.

4. The apparatus of claim 1 wherein a holder means comprises:
   (a) a pair of spring members attached to the tube extending outwardly and generally longitudinally to the tube,
   (b) a pair of sealing surfaces on the spring members proximate the ends of the members to align with the openings in the barrel and hold the barrel in position, and
   (c) a passage in one of the sealing surfaces communicating with the pressure source means.

5. The apparatus of claim 4 wherein the sealing surfaces are tapered metal disks to interface with and seal the openings.

6. The apparatus of claim 1, wherein it further comprises a glass lathe means to synchronizingly turn two chucks at the same speed in the same direction and wherein one chuck is equipped to hold and spin the tube and the other chuck is equipped to hold and spin the glass tubing to be tubulated to the barrel.

7. The apparatus of claim 1, wherein the pressure source means comprises an air compressor and valve means to control the pressure in the barrel sufficient to blow a hole upon heating the barrel to the proper temperature and to maintain pressure to the barrel during the tubulating process sufficient to maintain the hole open during cooling of the glass.

8. An apparatus to seal glass tubing to and open into the side of a glass barrel having two open ends comprising:
   (a) a glass lathe means to synchronizingly turn two opposing first and second chucks in the same direction on the same center line of spin, wherein the first chuck is capable of holding and turning a piece of glass tubing to be sealed to the barrel,
   (b) a barrel holding means to hold the glass barrel while being held and spun by the second chuck comprising:
      (i) a tube held in the second chuck, the tube being of sufficient internal size to receive glass tubing already sealed to the barrel,
      (ii) a pair of spring members mounted on an exposed end of the tube extending outwardly and aligned to hold the open ends of the barrel and to position it opposing the first chuck,
      (iii) sealing means on each spring member hermetically sealing off the open ends of the barrel, and
      (iv) a passage opening through one of the sealing means to the inside of the barrel, and
   (c) a pressure source means to provide pressure to the passage and to the inside of the barrel.

9. The apparatus of claim 8, wherein fixed fire means is positioned to melt the end of the tubing to be sealed and at the same time melt the point on the barrel, while the chucks are spinning.

10. A method to weld glass tubing to and open into the side of a glass barrel having two open ends comprising:
 (a) holding a piece of glass tubing in a glass lathe chuck,
 (b) holding a barrel holding means in a second opposing chuck, the holding means to hold the barrel and to align the exposed end of the tubing with a point on the barrel at which the tubing is to be attached,
 (c) hermetically sealing off both ends of the barrel and any other openings to the barrel,
 (d) spinning both chucks in the same direction synchronously,
 (e) heating the end of the tubing and the point on the barrel,
 (f) inducing pressure inside the barrel sufficient to blow a hole out at the point on the barrel,
 (g) contacting the heated end of the tube with the barrel at the point of the hole, and
 (h) maintaining pressure in the barrel until the glass cools.

11. The method of claim 10 wherein the glass barrel is a stopcock barrel.

12. The method of claim 10 wherein a glass tubing is connected to the side of the barrel normal to the two open ends opposite to the point on the barrel, and wherein the barrel holding means comprises a tube to which the balance of the holding means is attached, the method further comprising:
 (a) holding the tube in the second opposing chuck, and
 (b) inserting the tubing attached to the barrel inside the tube while the barrel is held by the barrel holding means.

13. The method of claim 12 wherein the glass barrel is a stopcock barrel with one glass tubing already sealed to the barrel opposite the point on the barrel.

* * * * *